Nov. 28, 1950          E. TALLMADGE          2,531,751

CAMERA BACK

Filed Jan. 18, 1947          3 Sheets-Sheet 1

INVENTOR.
BY Edgar Tallmadge
Quarles & French
ATTORNEYS

Nov. 28, 1950          E. TALLMADGE          2,531,751
CAMERA BACK

Filed Jan. 18, 1947          3 Sheets-Sheet 2

INVENTOR.
Edgar Tallmadge
BY
Quarles & French
ATTORNEYS

Nov. 28, 1950 E. TALLMADGE 2,531,751
CAMERA BACK
Filed Jan. 18, 1947 3 Sheets-Sheet 3
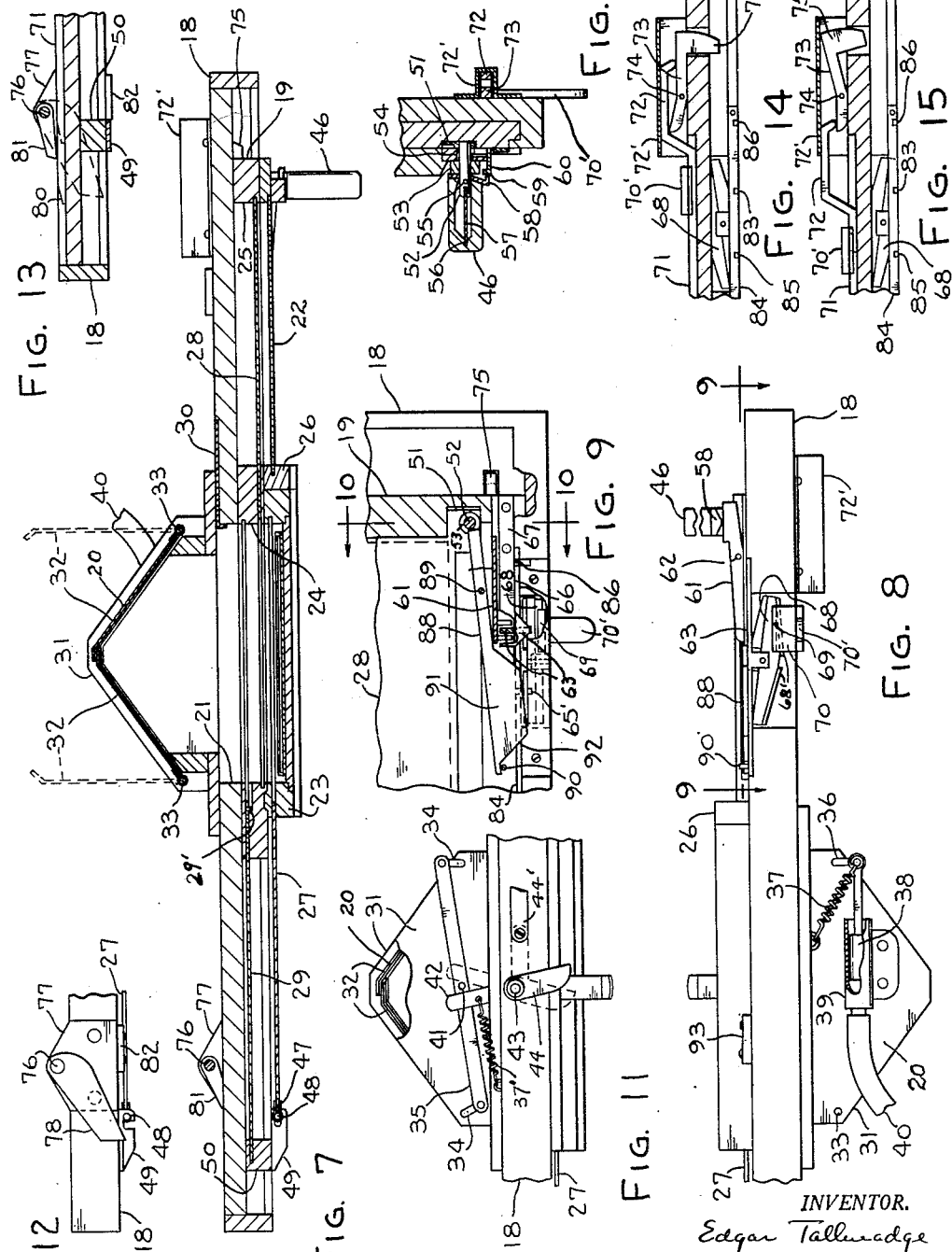
INVENTOR.
Edgar Tallmadge
BY
Quarles & French
ATTORNEYS

UNITED STATES PATENT OFFICE 2,531,751

CAMERA BACK

Edgar Tallmadge, Waukesha, Wis.; Edith M. Tallmadge sole heir of Edgar Tallmadge, deceased Application January 18, 1947, Serial No. 722,907

9 Claims. (Cl. 95—37)

The invention relates to camera backs, more particularly for studio cameras.

The general object of the invention is to provide a camera back that saves the operator's time and movements in preparing for and taking a picture. More particularly, according to the invention, the carriage carrying the film or plate holder and focusing screen is provided with a single handle by which it is moved and by which the carriage locking means and a dark slide is controlled, the movement of the carriage by this handle acting to open the shutter when the ground glass focusing screen is in position for viewing the image.

Heretofore it has been usual to provide masks that may be placed in or removed from the viewing opening to change the size of the picture. This insertion or withdrawal of masks to suit the camera back for different sized pictures is an inconvenience. It has also been proposed to use a pair of separately adjustable dark slides which have to be separately positioned independent of other adjustments or movements of the camera back. One of the objects of the present invention is to provide an arrangement whereby a blocking-off dark slide is operable as an incident to the setting of other parts of the mechanism for taking pictures of different sizes and permitting the change of one picture size to another without any special thought on the part of the operator as to the positioning of these slides.

A further object of the invention is to provide a camera back in which the protective slide for the film holder is automatically withdrawn from in front of the film or other sensitized material as the carriage moves to a picture taking position whether the picture to be taken is of full film area or part film area.

The invention further consists in the several features hereinafter set forth and more particularly defined by claims at the conclusion hereof.

Referring to the drawings:

Fig. 7 is a horizontal sectional view taken on the line 7—7 of Fig. 3;

Fig. 8 is a bottom plan view, parts being broken away and parts being shown in section;

Fig. 9 is a detailed vertical sectional view taken on the line 9—9 of Fig. 8;

Fig. 10 is a detailed vertical sectional view taken on the line 10—10 of Fig. 9;

Fig. 11 is a detailed top plan view, parts being broken away;

Fig. 12 is a detailed top view of one end of the camera back;

Fig. 13 is a detailed horizontal sectional view taken on the line 13—13 of Fig. 4;

Fig. 14 is a detailed horizontal sectional view taken on the line 14—14 of Fig. 1 showing one of the stops in operative position;

Fig. 15 is a view similar to Fig. 14 showing the stop in inoperative position;

Figure 1:
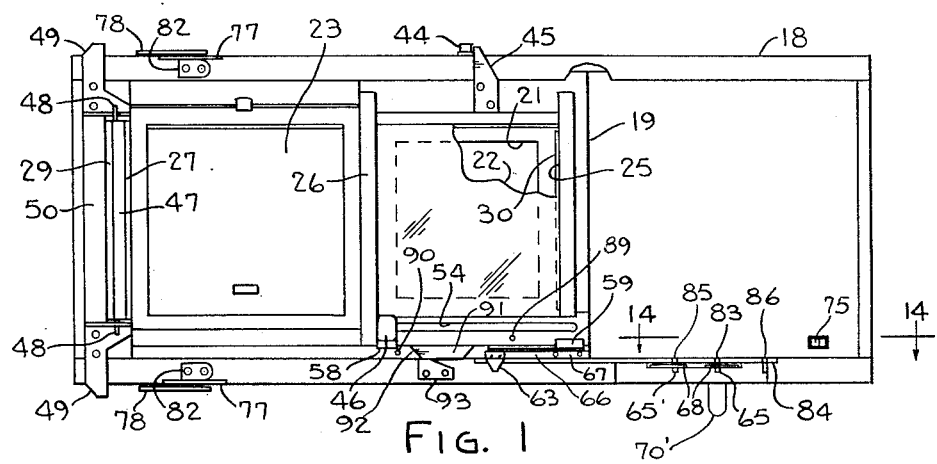
Fig. 1 is a rear elevation view of a camera back embodying the invention, parts being broken away, the parts being in position for focusing.

My improved camera back includes a fixed main frame 18, a carriage 19 lengthwise slidably mounted in guides at the upper and lower portions of the back of said frame, and a shutter 20 mounted on the front of said frame and controlling passage of light through the viewing opening 21 in said frame.

The carriage 19 forms an apertured frame for a ground glass or focusing screen 22 and a plate or film holder 23 which is removably secured on said carriage in back of the opening 24 which opening is divided from the opening 25 in which the screen 22 is mounted by a partition 26 (see Fig. 7).

The film holder 23 is provided with the usual protective dark slide 27 controlling the exposure of the sensitized film or plate, and the carriage itself has a dark slide 28 slidably mounted in guideways in the carriage and movable from the opening 24 to a position over the opening 25 in front of the screen 22. Another slide 29 acting as a guide for the support for the slide 27 is moved under certain settings by the carriage 19 by its engagement with a projection 29' thereon and extends through guideways in the left side of the carriage. Another movable dark slide 30 used in blocking off a part of the viewing opening 21 is slidably mounted on the front of the frame 18.

The shutter 20 includes top and bottom portions 31 fixed to the frame 18 and cooperating with a pair of pivotally mounted movable overlapping shutter flaps or doors 32 to exclude light from the viewing opening 21 until said doors are opened. The doors 32 are simultaneously moved to open position by providing their hinge pivot shafts 33, as shown in Fig. 11, with crank arms 34 operatively connected together by a link 35, whereby movement of either of the shafts 33 or the link 35 will open or close the shutter. One of the shafts 33 has another crank arm 36 (see Fig. 8) connected to a shutter closing spring 37 and to the rod of a pneumatically operated piston 38 working in an air cylinder 39 connected by a flexible tube 40 with the usual hand bulb. Compression of the air in said bulb serves to move the piston 38 to open the shutter and time the exposure. For opening the shutter for focusing the link 35 carries a pin 41 adapted to be engaged by a crank arm 42 mounted on a shaft 43 vertically pivoted in the frame 18 and carrying an arm 44 adapted to be engaged by a projection 45 on the carriage 19 as said carriage is moved toward the left to focusing position, so that said link 43 will be moved against the action of a spring 37' to open the doors 32. When the carriage 19 is moved toward the right after focusing to a picture taking position, the shutters 32 are closed by the spring 37 until operation of the bulb by the photographer opens the shutters for the desired exposure period of the sensitized photographic surface, such as a plate or film. For holding the doors of the shutter in an open position a pivoted latch 44' may be turned to the dotted line position shown in Fig. 11 to engage the arm 44.

Figure 2:
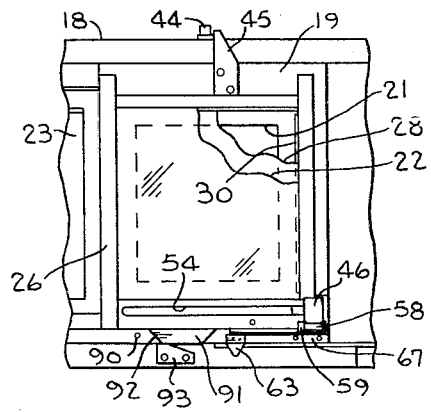
Fig. 2 is a view similar to Fig. 1 showing a portion thereof with the focusing opening covered.
Figure 3:
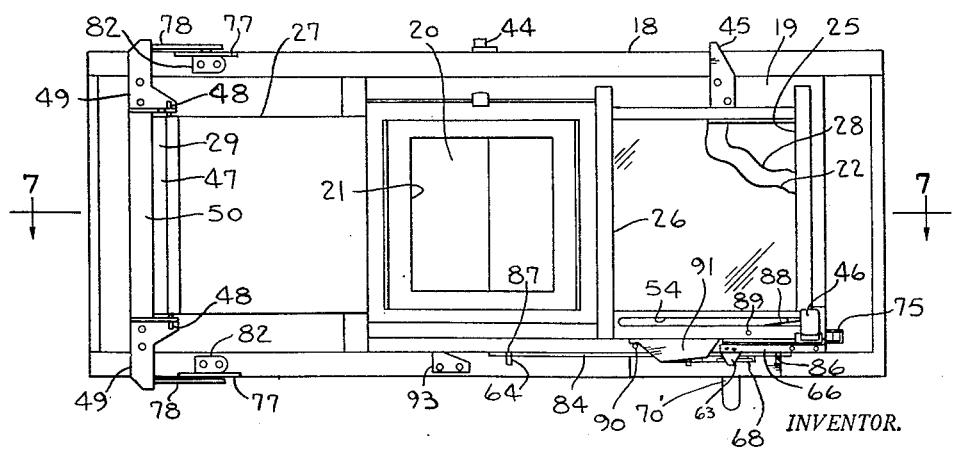
Fig. 3 is a view similar to Fig. 1 showing the parts in position for making a full plate exposure, the film or plate back being removed.

With the above arrangement when the carriage 19 is in the position shown in Fig. 1, the screened opening 25 is alined with the viewing opening 21, and the shutter 20 is opened, the slide 28 being then in an open position, and the operator then views the object through the lens (not shown) between the object and the opening 21 and focuses the lens. Thereafter, he grasps a handle 46 of a latch mechanism, hereinafter described, which is operatively connected to the slide 28, so that reciprocation of the handle 46 will cause a similar movement of the slide relative to the carriage 19 until the parts connecting the handle with said slide abut the right hand side of the carriage, as shown in Fig. 2, at which time the slide 28 covers the viewing opening, so that the carriage may be moved toward the right by the continued pushing movement on the handle 46 toward the right, whereby the carriage moves in this same direction until the film holder portion of the carriage moves to a position facing the viewing opening 21, as shown in Fig. 3, in which the film itself has been removed from the holder. During this same movement the dark slide 27 for the film holder 23 has been moved relative to the film to a position permitting the exposure of the film when the shutter 20 is operated. This movement of the slide 27 is brought about by releasably anchoring the exterior edge 47 of the slide through pins 48 to brackets or hangers 49 which are secured in spaced relation on a vertically disposed slide member 50 to which the slide 29 is also secured.

Figure 4:
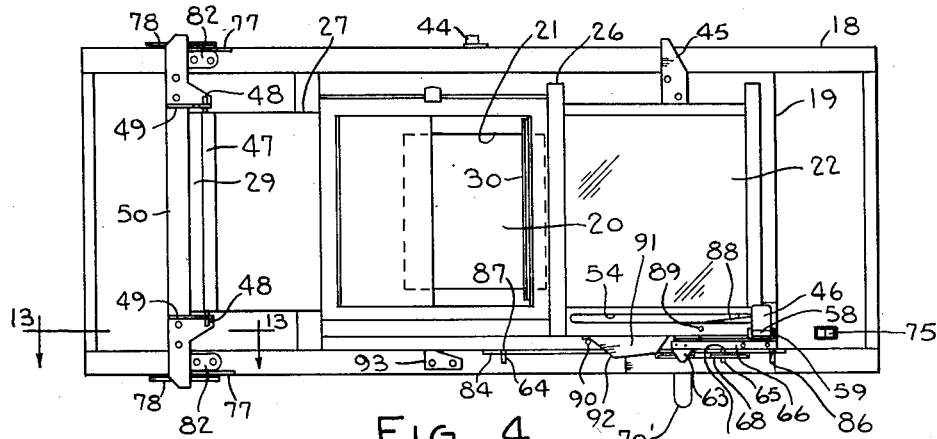
Fig. 4 is a view similar to Fig. 3 showing the parts in position for making the first half plate exposure.
Figure 5:
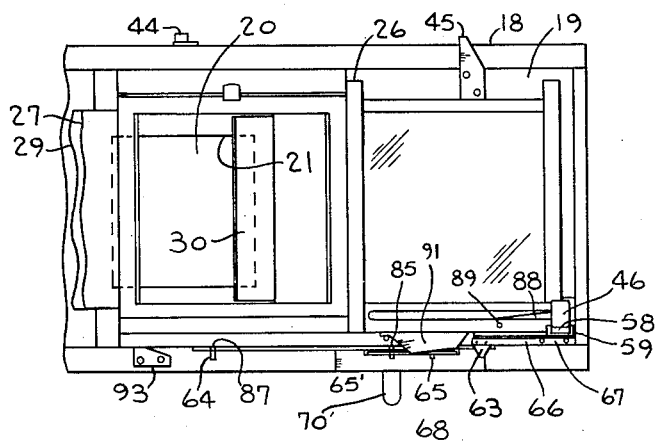
Fig. 5 is a view similar to Fig. 4 showing a portion thereof with the parts in position for making the second half plate exposure.

With the parts positioned as above described and shown in Fig. 3, the photographer presses the bulb to open the shutter 20 for the exposure, and then grasping the handle 46 and pushing toward the left, the carriage may be returned to the initial position, shown in Fig. 1, thereby moving the dark slide 27 into protective relation with the film of the holder and bringing the carriage to its extreme left position and thereafter moving the dark slide 28 into the section of the carriage containing the film holder and exposing the screened opening 25 for another focusing, the shutter having been opened as previously described as the carriage moves to this focusing position.

Where only half of the film or plate is to be used at a time, the dark slide 30 is moved as hereinafter described by its connection with a slide rod 71 to the position blocking off a part of the viewing opening 21, as shown in Fig. 5. For taking half size pictures the carriage is first moved toward the right from the position shown in Fig. 1 to the position shown in Fig. 4 where its movement is arrested by stop mechanism hereinafter described, thereby blocking off a portion of the viewing opening 21 by the dark slide 27 and another portion by the slide 30 to block off the left hand half of the film or plate, and then the part, the right hand half of the plate or film, not blocked off is exposed, as previously described, and the carriage returned to its initial position. After another focusing and a movement of the dark slide 28 to the right to a position where the handle 46 engages the carriage, the carriage is again moved over, this time to the extreme right, as shown in Fig. 5, at which time the dark slide 30 together with the frame 18 have blocked off the right hand half of the viewing opening 21 and the dark slide 27 because of the movement of the carriage relative to the slide member 50 is in a position exposing the left hand portion of the film or plate to the light through the half opening then formed, as shown in Fig. 5, and after this exposure, the carriage is returned back to its focusing position, as shown in Fig. 1.

In order that the operator may readily position the carriage 19 for taking a full sized or half sized picture, releaseable latch and stop mechanism is provided. Referring to Figs. 8, 9 and 10, the slide 28 has an extension 51 to which a stud or pin 52 is rigidly secured, which stud has a plate 53 rigidly connected thereto and cooperating with the part 51 to guide the slide in the guideway 54 formed in the carriage frame. The stud 52 also has the handle 46 pivotally connected thereto by a pin 55, the handle being hollowed out and slotted at 56 to receive one end of a flat spring 57 whose other end is mounted in the stud, said spring acting to normally hold the handle 46 in a position alined with the stud 52 and tending to bring it back to this position when the handle 46 is depressed or swung downwardly. The handle carries a latch engaging member 58 which on the depression of said handle engages a side portion 59 of an arm 60 of a lever 61 pivotally mounted on a pin 62 secured to the carriage. The other arm of said lever is pressed out and riveted to a tongued member 63 which forms a detent or latch that is adapted to engage in either the fixed notch 64, 65', or 65. For constantly urging the lever 61 to a locking position, so that it will automatically drop into said notches on the movement of the carriage by the handle 46 a flat spring 66 is anchored at one end 67 to the carriage and at its other end is connected to the detent portion of the lever 61. Access of the detent to the notch 65 is controlled by a pivoted blocking member 68 having a flange 68' forming a camming surface engaged by the flanged end 69 of a member 70 provided with an operating handle extension 70'. The member 70 at the front of the camera back is integrally connected to a slide rod 71 (see Figs. 6, 10, and 13). At its right hand end 72 this slide rod is guided in a channel guide 72' and has a camming connection with a lever 73 pivotally mounted on the frame 18 at 74 and having a stop portion 75 forming in the position shown in Figs. 1 and 3 a stop to limit the movement of the carriage 19 toward the left in the taking of a full size picture and movable to the release position, shown in Fig. 15, when the rod 71 is moved toward the left by the plate 70, so that in the taking of half pictures and particularly the second half of the film, the carriage may be moved to the extreme right of the frame 18 in the position shown in Fig. 5. Also the rod 71 is used to automatically control the throwing in or out of a stop for the slide member 50 and the movement of the dark slide 30 which as shown in Fig. 6 is riveted to said rod.

Figure 6:
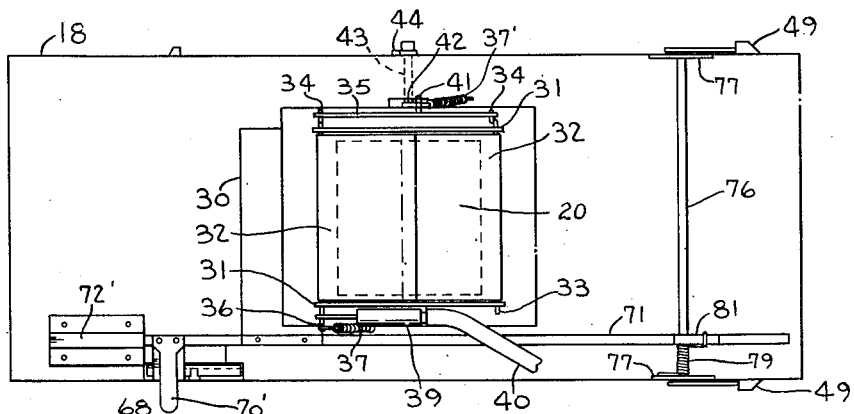
Fig. 6 is a front elevation view of the camera back.

Referring to Figs. 6, 12 and 13, a vertically disposed shaft 76 is suitably pivoted in bracket arms 77 on the frame 18 and carries stop arms 78 at its opposite ends. A coiled torsion spring 79 operatively connected to the frame and to the shaft normally urges these stop arms into the stopping position shown in Fig. 12 and Figs. 1 and 3 where they are engageable with the brackets or hangers 49 of the slide member 50 to limit the movement of this slide, and hence the dark slide 27 and slide 29 associated therewith when the full size plate or film exposure is desired. For the half exposures the rod 71 has a wedge shaped end 80 which on the movement of the slide 68 toward the left engages a crank arm 81 secured to the shaft 76 and thereby turns the shaft 76 against the action of the spring 79 to move the stop arms 78 out of the path of the hangers 49, so that said hangers may move into engagement with the fixed stops 82.

Referring to Figs. 4 and 7, it will be noted that the projection 29' on the slide 29 is engaging the carriage 19, and this connection assists in moving the slide 50 with the carriage from the position shown in Fig. 1 to the positions shown in Figs. 3 and 4 though the friction of the slides 27 and 29 also acts to cause the slide 50 to move with the carriage 19.

The indexing plate provided with the notch 65 also has a notch 65', access to which is controlled by the pivoted blocking member 68 previously referred to. The notch 65 alines with the notch 83 in an indexing plate 84, and the notch 65' alines with a notch 85 in said plate 84. When the plate member 70 with its handle 70' is moved to the position shown in Fig. 1, the blocking member 68 blocks off the notches 85 and 65' because it is then swung up so as to prevent the engagement of the detent 63 in said notches, and when the carriage is moved to the position shown in Fig. 3 in which the detent can then engage the notches 65 and 63, it is in a position for taking a full sized film picture. When the plate member 70 is moved to the position shown in Figs. 4 and 5, the slide 30 is moved therewith and the blocking member 68 is swung so as to block off the notches 83 and 65 and provide access of the detent 63 to the alined notches 85 and 65' so as to position the carriage for the taking of the right hand half of the negative, and when the carriage is moved to the position shown in Fig. 5, the detent 63 will then engage with alined notches 86 in the plate 84 and the plate provided with the notches 65 and 65' for taking the left hand half of the negative. When the carriage is in the focusing position shown in Figs. 1 and 2, the detent 63 will engage the notch 64 and an alined notch 87 in the plate 84.

In order that the dark slide 28 may be locked in protective position and move with the carriage 19 in this position on the movement thereof toward the left from the positions shown in Figs. 3, 4, and 5, a gravity actuated latch 88 is pivotally mounted on the carriage at 89 and is swung upwardly under the action of its weighted end to engage the stud 52, as shown in Fig. 9, it being noted that said swinging movement is limited by a stop pin 90, and that weighted end 91 of said latch has a cam surface 92 adapted to engage a cooperative fixed cam member 93 on the frame 18 so as to lift said latch 88 from locking engagement with the stud 52 as said carriage is moved toward the left into the focusing position, so that said dark slide 28 may then be moved toward the left relative to the carriage 19 by the movement of the handle 46 from the position shown in Figs. 2, 3, 4, and 5 to the position shown in Fig. 1 to expose the viewing opening 21.

With the above arrangement it will be noted that the movements of the carriage 19, the shutter 20, and the slides 27, 28, and 29 and the release of the carriage in its different indexed positions relative to the frame 18 are all controlled by the operator's movement of the handle 46 which as previously noted moves lengthwise of the carriage to operate the slide 28, moves with the carriage to shift the same lengthwise of the frame 18 to open the shutter 20 and to move the slides 27 and 29 relative to the film or plate holder and is movable in a plane at an angle to the carriage to release the latch 61 from any one of its stop or indexing positions.

It will be noted that the control means 70, 70', and 71 is only moved to set the apparatus for the taking of either full size or half size pictures, that in its position shown in Figs. 1 and 2 it has moved the blocking member 68 to block off the notch 65' so that the detent 63 will engage in the notch 65 for the taking of a full size picture, and that in its position shown in Figs. 4 and 5 for the taking of half pictures it has moved the blocking member 68 to block off the notch 65 and moved the dark slide 30 to its blocking position and has also released the stop arms 78 so that the slide member 50 may move with the carriage into the position in which it may engage the stops 82.

I desire it to be understood that this invention is not to be limited to any particular form or arrangement of parts except in so far as such limitations are included in the claims.

What I claim as my invention is:

1. In a camera back, the combination of a support provided with a viewing opening, a normally closed shutter mounted in front of said viewing opening and controlling passage of light through said opening, pneumatic means for opening the shutter, a lever, means operated by said lever for opening the shutter, a carriage having a focusing screen and a sensitized film holder mounted thereon in spaced relation, a dark slide slidably mounted on the carriage for covering said viewing opening and provided with a handle for moving the same relative to said carriage to an open position and to a closed position, said handle in the closed position of said slide adapted to move said carriage lengthwise of said support to move the carriage from a focusing position to a picture taking position in one direction and return the carriage to a focusing position in the opposite direction, and means on the carriage engageable with said lever to open the shutter when the carriage reaches a focusing position, said means being releasable from said shutter operating means when the carriage is in picture taking position.

2. In a camera back, the combination of a support provided with a viewing opening, dark slides shiftable to block off portions of said viewing opening, a carriage slidably mounted on said support carrying a focusing screen and a photographic material holder, one of said dark slides being a cover slide for said film holder and being slidably mounted on said support and being connected with said carriage for movement by and with said carriage to a stop position, indexing means for said carriage including an adjustable member, stop means for limiting the movement of said last named dark slide with said carriage including a movable stop operated and controlled by the movement of said adjustable member.

3. In a camera back, the combination of a support provided with a viewing opening, a carriage slidably mounted on said support relative to said viewing opening and carrying a focusing screen and a photographic material holder, fixed indexing means on said support, latch mechanism mounted on said carriage and engageable with said indexing means in a plurality of different positions to limit the movement of said carriage, and an adjustably positioned member selectively cooperating with said fixed indexing means for determining the picture taking position of said carriage, a dark slide for the photographic material holder, a slide to which said dark slide is secured movable with said carriage to a stop position, and stop means for said dark slide-carrying slide movable into and out of operative relation therewith on the movement of said adjustably positioned member.

4. In a camera back, the combination of a support provided with a viewing opening, a carriage slidably mounted on said support and carrying a focusing screen and a sensitized material holder in spaced relation, a dark slide slidably mounted in the carriage and movable relative to said focusing screen, a handle operatively connected to said dark slide for moving the said dark slide to an open position and to a closed position and operatively connected to said carriage to move the same with the dark slide in closed position, means including a latch for locking the carriage in different positions, and means operable by said handle for releasing said latch from any one of its locked positions while the dark slide is in a position for movement with said carriage.

5. In a camera back, the combination of a support provided with a viewing opening, a carriage slidably mounted on said support and carrying a focusing screen and a sensitized material holder in spaced relation over openings therein, a dark slide slidably mounted in the carriage relative to both of its openings, a handle connected to said dark slide for moving said slide to an open position and to a closed position relative to said screen and operatively connected with said carriage in the closed position of said slide to move said carriage, means including a latch for locking the carriage in different positions, and means operable by said handle for releasing said latch from any one of its locked positions while the dark slide is in its closed position, means for locking said dark slide in its closed position after movement of the carriage out of focusing position, and means for releasing said dark slide locking means from locked position when the carriage reaches a focusing position.

6. In a camera back, the combination of a support provided with a viewing opening, a sliding carriage provided with spaced openings and a focusing screen and photographic medium holder mounted in said openings and movable on said support from a focusing position to an exposure position, a dark slide slidably mounted in said carriage for movement to an open position and a closed position relative to said focusing screen, a dark slide for the holder, means connecting an exteriorly disposed portion of said last named dark slide to said support, means for locking said carriage in a focusing position and in an exposure position, and manually operated means connected to said first named dark slide to move the same to its open position and to its closed position and to move said carriage while the said dark slide is in its closed position, said manually operated means also being operable to release said carriage locking means.

7. In a camera back, the combination of a support provided with a viewing opening, a carriage slidably mounted on said support and carrying a focusing screen and a photographic material holder, a slide on said support, a dark slide for said holder, means for connecting an exposed portion of said named dark slide to the first named slide, a second dark slide mounted on said support and movable to block off a portion of said viewing opening, and means adjustably mounted on said support and operatively connected to said second slide for positioning the same, and stop means for the slide carrying said first dark slide operatively connected to the means for positioning said second slide.

8. In a camera back, the combination of a support provided with a viewing opening, a carriage slidably mounted on said support and carrying a focusing screen and a photographic material holder, a dark slide slidably mounted in the carriage relative to both of said openings, a handle connected to said dark slide for moving the same to an open position and a closed position relative to said focusing screen and for moving said carriage when said dark slide is in closed position, means including spaced notches in said support and a latch operable by said handle for locking the carriage in different positions, an oscillatory blocking member for said notches, and manually operable means for operating said blocking member.

9. In a camera back, the combination of a support provided with a viewing opening, a carriage slidably mounted on the support carrying a focusing screen and photographic holder, a dark slide distinct from that of said holder slidably mounted on said support and movable relative to said viewing opening to block off a portion thereof, the movement of said dark slide being controlled by means operable from the back of said camera comprising a slidable rod and a manually adjustable indexing stop controlling member for the carriage connected to said rod for actuating the same as an incident in setting said stop controlling member.

EDGAR TALLMADGE.

REFERENCES CITED

The following references are of record in the file of this patent:

UNITED STATES PATENTS

| Number | Name | Date |
|---|---|---|
| 499,763 | Taffer | June 20, 1893 |
| 520,290 | Barker | May 22, 1894 |
| 668,888 | Standiford | Feb. 26, 1901 |
| 715,617 | Smith | Dec. 9, 1902 |
| 771,282 | Smith | Oct. 4, 1904 |
| 1,037,934 | Lamb | Sept. 10, 1912 |
| 1,857,706 | Zabrocki | May 10, 1932 |
| 1,933,889 | Burnell | Nov. 7, 1933 |
| 1,948,141 | Stokes | Feb. 20, 1934 |
| 2,371,592 | Gorey | Mar. 13, 1945 |
| 2,397,742 | Kals | Apr. 2, 1946 |